May 11, 1943.   M. R. HUTCHISON, JR   2,319,063
FOLDING CAMERA
Filed July 19, 1941

Miller R. Hutchison Jr.
INVENTOR

BY
ATTORNEYS

Patented May 11, 1943

2,319,063

UNITED STATES PATENT OFFICE 2,319,063

FOLDING CAMERA

Miller R. Hutchison, Jr., Rochester, N. Y., assignor to Eastman Kodak Company, Rochester, N. Y., a corporation of New Jersey Application July 19, 1941, Serial No. 403,177

7 Claims. (Cl. 95—45)

This invention relates to photography and particularly to folding camera construction. One object of my invention is to provide a folding camera which may be quickly and easily brought into a picture-taking position from a folded position. Another object of my invention is to provide a camera with telescoping parts which have a smooth "bearing fit" and which are provided with a means for causing one part to move axially on the other part. Another object of my invention is to provide a connection between two telescoping parts which may cause one part to move relative to the other and which at the same time tends to hold the parts in a set position. Another object of my invention is to provide a relatively inexpensive camera including telescoping tubes with a simple and efficient light-excluding seal between the relatively moving tubular members. Still another object of my invention is to provide a simple screw type of connection which may hold the parts of the screw connection by means of a separate inexpensive element which can be readily assembled to the relatively movable elements and other objects will appear from the following specification, the novel features being particularly pointed out in the claims at the end thereof.

Coming now to the drawing, wherein like reference characters denote like parts throughout:

In photographic apparatus one of the difficult things in designing is to avoid light leak through camera parts which may fog film. Such light leak may well occur where two tubular members are made to telescope so that they can be adjusted to different positions, for instance, for collapsing a camera or for focusing a camera. Typical examples of photographic equipment utilizing such telescoping parts are camera front extensions, camera focusing parts, lenses having focusing elements and focusing adjustment built into lens mounts. I find that my invention can readily be applied to these and other camera parts which must include two smoothly moving coaxially arranged members which must also exclude light between the members.

Figure 1:
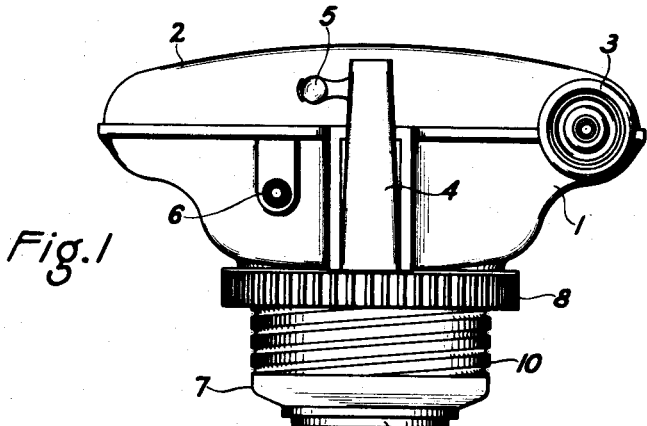
Fig. 1 is a top plan view of a camera constructed in accordance with and embodying a preferred form of my improved extension and focusing mechanism.

As indicated in Fig. 1 of the drawing, wherein a preferred embodiment of my invention is shown, a camera may include a camera body 1, having the usual back 2, and film winding handle 3. The camera may include a finder 4 on the top wall of the camera and a latch 5 for holding the camera back in an operative position. A trigger 6 may be mounted on the camera body and may be connected to a camera shutter 7 in any desired manner.

In the present instance I provide a camera with a knurled ring 8 which is revolubly mounted on the camera body 1 and which carries a tubular member 9 which has a "bearing fit" with the tubular extension 10. The tubular extension 10 carries the shutter 7 in which a lens cell 11 may be placed to carry the objective or a portion of the objective. If a single objective is used behind the shutter, the front cell may omit any part of the objective.

In the embodiment shown the extension 10 is to permit the camera to be collapsed for convenience in carrying and to be extended into a picture-taking position when the ring 8 is turned, this ring being later turned toward the end of its movement for focusing the camera if an objective requiring focusing is used in the shutter 7.

The telescoping tubular members 9 and 10 as above explained are provided with a bearing fit which means that the outer diameter of the tube 10 and the inner diameter of the tube 9 are nicely adjusted so that one turns smoothly in the other and may slide back and forth freely. This fit can be readily obtained with a reasonable degree of accuracy without much expense as long as only a smooth cylindrical wall is required. However, in known types of cameras where a screw thread of the usual type is formed, the expense is quite considerable because the threaded elements must be made to mate accurately if the parts are to work smoothly, and, if they are to remain in a set position and at the same time turn freely, it is necessary to provide some supplemental friction means.

I have found that much more desirable threaded connections can be formed between telescoping tubular members, such as the tubes 9 and 10, by cutting spiral grooves in these members.

Figure 3:
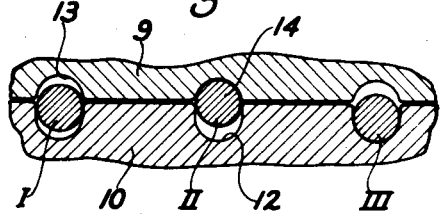
Fig. 3 is a greatly enlarged view showing a section through a pair of telescoping members and illustrating the inserted thread member.

As indicated in Fig. 3, the tubular member 9 is provided with spiral grooves 12 which may be of a single pitch or a multiple pitch. A similar groove 13 is cut in the tubular member 10. If desired, the depth of one of the grooves 12 or 13 may be less than the depth of the opposing groove as it is desirable to prevent the spiral spring 14 which forms a thread from moving from a position in which it will block any light which may tend to enter between the tubular members 9 and 10.

Figure 5:
Fig. 5 is an enlarged fragmentary view of a portion of a thread member.
Figure 4:
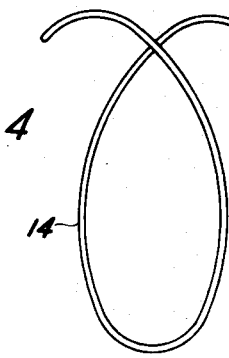
Fig. 4 is a perspective view of a typical thread member removed from the telescoping members.

It is especially pointed out that, while the grooves 12 and 13 must be of the same pitch, they nevertheless need not be accurately finished because one of the advantages of my present invention is that the thread is formed by a spiral spring 14 as shown in Fig. 4 which may be of hardened steel wire but which is not accurately formed. Actually, the inaccuracy in the form of spiral spring 14 becomes an advantage for the following reason. As indicated in Fig. 5, the spiral spring 14 will have waves or portions lying outside of a true spiral unless an especially prepared spring wire is used. Thus, this spring, when lying between the tubular members 9 and 10 and in the grooves 12 and 13, may contact here and there with different portions of the walls of the grooves. This is indicated in Fig. 3 where the position shown at I is midway between the bottoms of the grooves 12 and 13, the position shown at II is against the bottom of the wall 13, and the position shown at III is against the bottom wall of the groove 12. Thus small portions of the total length of the spring 14 serve as thread members to guide the tubular member 9 to and from the tubular member 10, and, in addition, the small contacting areas formed by the irregular surface of the spring 14 form frictional areas which tend to hold the tubular members in any set position.

Moreover, since the spring 14 does not accurately fit into the opening formed by the grooves 12 and 13, the parts need not be carefully formed and, in addition, the assembly of the parts is extremely simple.

If the spring coil 14 is of smaller diameter than that of the grooves 13, it may be compressed and sprung in place after which the tubular members may be screwed together. If, on the other hand, the coil spring 14 is considerably larger in diameter than the grooves 12, then it may be readily sprung into the grooves 12 of the inside member and the tubular member 10 may be screwed into place.

One of the features of my invention is that the coiled spring 14 provides a light-trap preventing light from entering between the tubular members 9 and 10. In order to do this, the spring 14 must be of more than 360° when it lies between the tubular members. Since the spring wire is of a cross-sectional shape of a size which will always lie partially out of either the slots 12 or 13, it will always block light tending to pass between the tubular members. For different types of work the length of the spring wire 14 may be varied. If desired, the spring may be as long as the shortest groove. In the embodiment shown in Fig. 2, the coiled spring might consist, for instance, of at least five convolutions so as to totally fill the groove 12 in the tubular member 9. This, however, is not necessary but may be done if desired.

Figure 6:
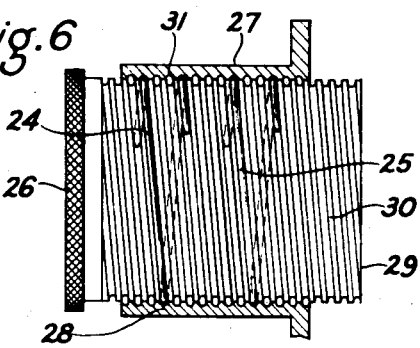
Fig. 6 is a sectional schematic view of a lens mount illustrating a second embodiment of my invention.

If it is desired to increase the frictional resistance of the tube 10 to the tube 9, the thread may consist of more than one spring 14. In the embodiment shown in Fig. 6 a pair of springs 24 and 25 are used to form a thread between a lens cell 26 and a lens mount 27, since in this embodiment the length of the tubular member 28 is such that two springs can be readily inserted so as to control the position of the inside tubular member 29. In such a lens mount no harm is done if the lens tube 26 is screwed from the lens mount 27 until the rear spring 25 no longer totally or partially contacts with the grooves 30 of the mount 29 since the spring 25 will remain in the grooves 31. Upon screwing the mount 26 rearwardly again, it will pick up the wire thread 25.

Figure 2:
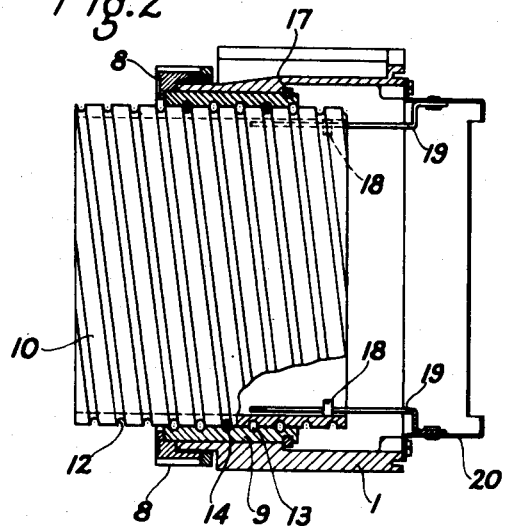
Fig. 2 is a section in the camera shown in Fig. 1 but with certain parts omitted to more clearly illustrate the invention.

It might be noted that in the embodiment of my invention, shown in Figs. 1 and 2, the knurled ring 8 is attached to the tubular member 9 which is rotatably mounted on the camera body 1 being held in position by the lock ring 17. The inner tubular member 10 is provided with a pair of pins 18 extending into grooved guides 19 which are attached to the camera body wall 20. Thus, by turning the ring 8, the tubular member is turned in or out according to the direction in which the knurled ring 8 is turned. This ring may be turned rapidly to project the camera objective into a picture-taking position after which it may be slowly turned to accurately focus the camera objective.

While the above two embodiments of my invention show two useful forms of an adjustable or focusing camera movement, it is obvious that such a movable connection is useful with many types of photographic apparatus. The chief advantage, as above described, is that a very smooth working fit can be obtained between two telescoping tubular members at extremely low cost; second, that an adequate light-tight joint is provided between the two tubular members at no extra cost; and, third, that assembly of the relatively movable parts is made an extremely simple operation. Not only does a spiral spring of somewhat irregular form set up a thread between two telescoping members, but, in addition, the comparatively small contact between the spiral spring and its grooves creates a desirable light tension to hold the parts in a set position.

If a spring is assembled between two tubular members and these members still move too freely, a second spring may be inserted if there is sufficient room or, if there is not sufficient room, the spring may be withdrawn and a small bend or kink formed in the wire after which it is reinserted. Thus, it is a simple matter to provide more or less tension as the particular job in hand may require.

The accurate work which is required for mating threads is entirely eliminated and, even where extreme accuracy of movement is required, it is comparatively inexpensive to grind the mating surfaces of the telescoping tubes. Thus, the tubes are guided solely by the surfaces of the tubes except as to their relative axial movement which is caused by small portions of the spring 14 through contact with small portions of the grooves 12 or 13.

It is possible, although fairly difficult, to produce a spring 14 having an accurate spiral shape but this is not desirable for my present invention. It is more desirable, as pointed out above, to use commercial spring wire which is somewhat irregular in shape so that the desired tension can be created on the walls of the grooves.

It is possible to use a good many different materials in making telescoping tubular sections into a threaded connection and, while I prefer to make the tubular members 9 and 10 of metal, it is quite possible to make these of a molded product which will slide satisfactorily on a polished or at least smooth spring wire coil. Such construction is suitable for inexpensive cameras, but for cameras utilizing objectives of wide aperture where the slightest deviation from a true axis may spoil the definition of a picture, it is desirable to make these tubes and have the bearing fit with only comparatively slight tolerances such as can readily be reproduced on commercial grinding machines.

What I claim and desire to be secured by Letters Patent of the United States is:

1. A device for focusing photographic equipment including two telescoping tubular members having smooth interengaging surfaces, each surface including similar facing spiral grooves of the same pitch, and means for guiding one telescoping tubular member on the other comprising a coiled spring snapped into the facing spiral grooves having a fixed width and depth in cross section, said spiral spring including coils of somewhat irregular shape and of a cross section substantially filling said facing spiral grooves in width but not in depth whereby said spring may move radially in said grooves whereby portions of said coils may contact with portions of the spiral grooves to frictionally hold said telescoping member in set positions.

2. In a folding camera, the combination with a camera body including a cylindrical opening therein, of a tubular extension fitting in the tubular opening and adapted to slide therein, both tubular members including spiral grooves cut into the tubular openings of a predetermined width, depth and pitch, and means for forming a light trap and threaded connection between the tubular members comprising a coiled wire spring encircling a tubular member more than once and lying at least partially in both sets of spiral grooves said spring being of a cross section to substantially fill the width of the spiral grooves but incompletely filling the depth thereof whereby radial movement of said spring in said facing grooves may occur.

3. In a folding camera, the combination with a camera body including a cylindrical opening therein, of a tubular extension fitting in the tubular opening and adapted to slide therein, both tubular members including spiral grooves cut into the tubular members of a predetermined width, depth and pitch, and means for forming a light trap and threaded connection between the tubular members comprising a coiled wire spring encircling a tubular member more than once and lying at least partially in both sets of spiral grooves, said spiral grooves being of the same width and having a fixed combined depth, said wire spring having a cross sectional area such that it incompletely fills the cross section of the facing spiral grooves but which may nevertheless form a thread on which the two tubular members may turn one relative to the other, said wire spring having a width to substantially fill the width of the spiral grooves and a depth insufficient to fill the fixed depth of the combined grooves whereby limited movement of the spring in the grooves may be permitted, said spring being so positioned as to block light entering between the cylindrical opening and tube.

4. A device for focusing photographic equipment including two telescoping tubular members having smooth interengaging surfaces having a bearing fit for guiding one tubular member on the other, the facing tubular surfaces each including a spiral groove cut in the surface thereof and having the same pitch, an irregularly formed spring of more than one convolution of a size and shape which can be sprung into one spiral groove and which can be screwed into the other spiral groove whereby one telescoping tubular member may be screwed into and out of the other and a light friction retarding such movement may be formed by the irregularities of the spiral spring pressing on limited areas of a spiral groove.

5. A device for focusing photographic equipment including two telescoping tubular members having smooth interengaging surfaces having a bearing fit for guiding one tubular member on the other, the facing tubular surfaces each including a spiral groove cut in the surface thereof and having the same pitch, a coiled spring of a size to loosely fit into the spiral grooves and encircle a tubular member at least once, said spring deviating from a true coil by irregularities in the shape thereof whereby certain areas of said spring may have frictional contact with the walls of said spiral grooves and other areas thereof may lie loosely therein.

6. A device for focusing photographic equipment including two telescoping tubular members having smooth interengaging surfaces having a bearing fit for guiding one tubular member on the other, the facing tubular surfaces each including a spiral groove cut in the surface thereof and having the same pitch, a coiled spring of a size to loosely fit into the spiral grooves and encircle a tubular member at least once, said spring deviating from a true coil by irregularities in the shape thereof whereby certain areas of said spring may have frictional contact with the walls of said spiral grooves, one tubular member being guided in movement relative to the other by the relatively small contacting areas of said spring and spiral groove, at least a portion of said spring always lying in at least a small area of each spiral groove.

7. A device for focusing photographic equipment including two telescoping tubular members having smooth interengaging surfaces, each surface including similar facing spiral grooves of the same pitch, and means for guiding one telescoping tubular member on the other comprising a coiled spring snapped into the facing spiral grooves, said spring fitting said grooves loosely and engaging only spaced areas thereof, the depth of each groove being less than the cross section of said spring whereby said spring may always lie partially in each groove to form a light trap therebetween.

MILLER R. HUTCHISON, Jr.